UNITED STATES PATENT OFFICE.

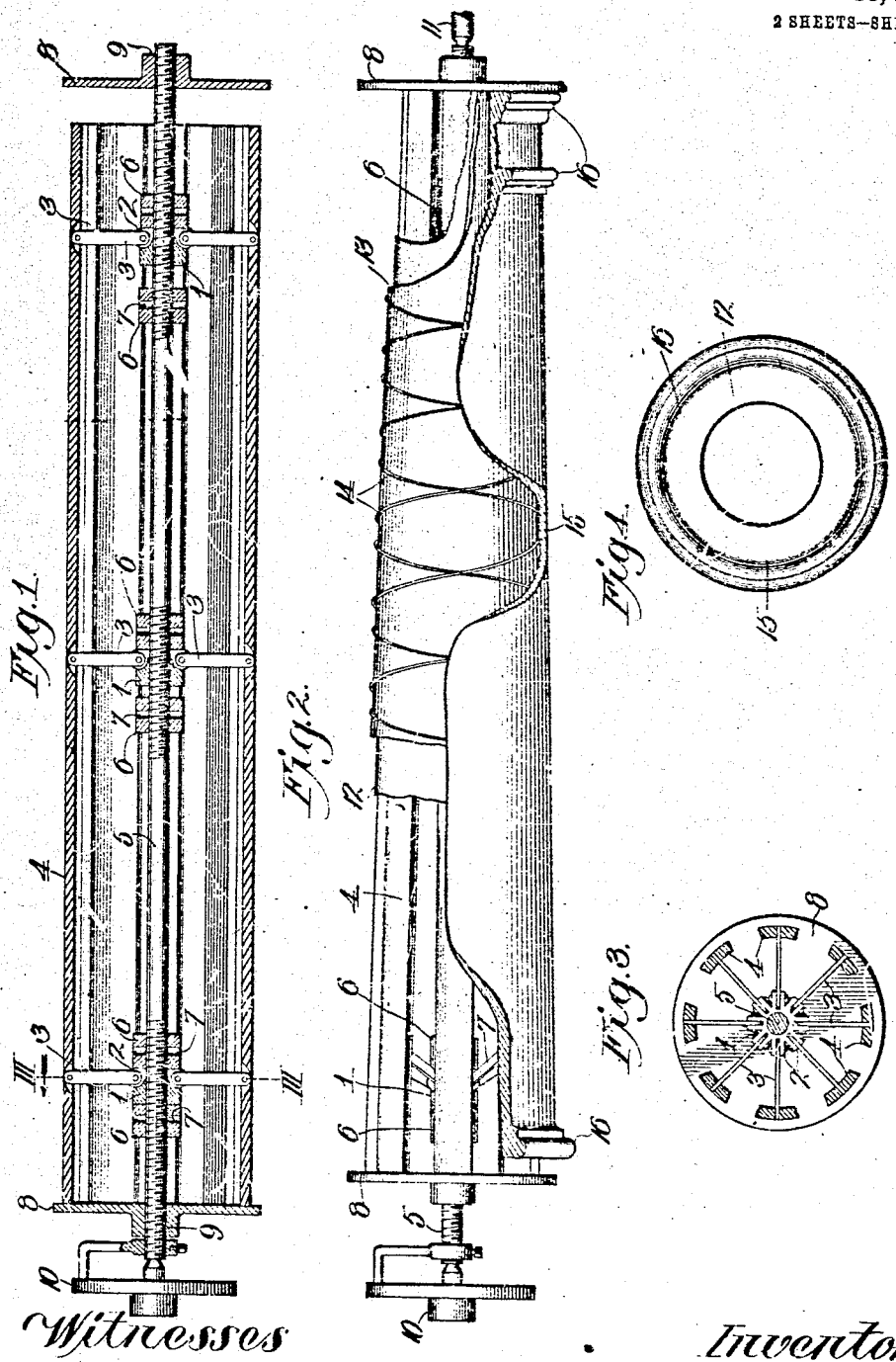

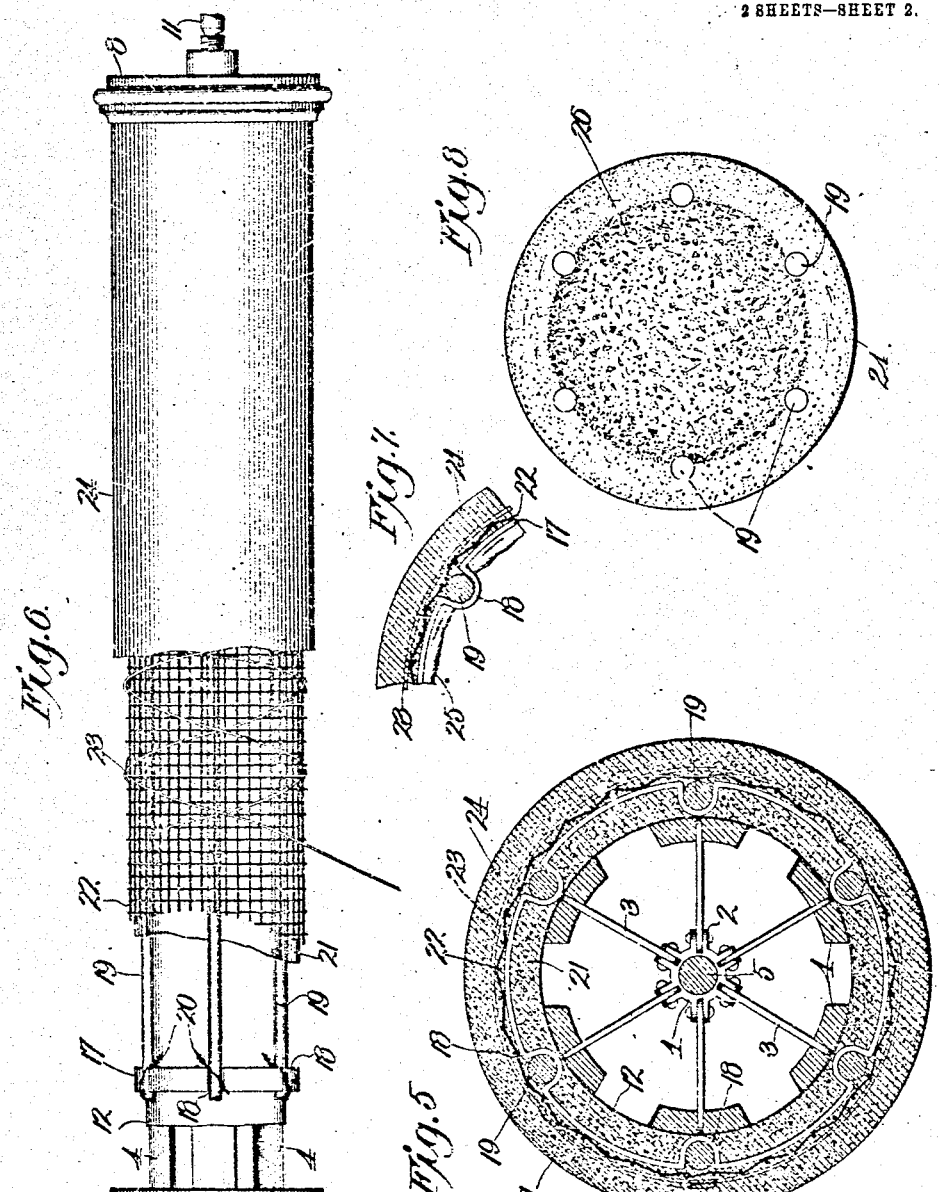

ALBERT G. HIGGINS, OF KANSAS CITY, MISSOURI, ASSIGNOR OF ONE-HALF TO R. M. HAVENS, OF KANSAS CITY, MISSOURI.

METHOD OR PROCESS OF MAKING ARTIFICIAL-STONE OR PLASTER COLUMNS.

945,948.

Specification of Letters Patent.   Patented Jan. 11, 1910.

Application filed June 23, 1908.  Serial No. 439,902.

*To all whom it may concern:*

Be it known that I, ALBERT G. HIGGINS, a citizen of the United States, residing at Kansas City, in the county of Jackson and State of Missouri, have invented certain new and useful Improvements in the Methods or Processes of Making Artificial-Stone or Plaster Columns, of which the following is a specification.

This invention relates to artificial stone or plaster columns and the method of and apparatus for making the same, and my object is to produce strong and durable columns at less expense and more expeditiously than such columns can be made by employing the usual molds and depositing or pouring the plastic material therein.

A further object is to produce cores capable of being diametrically enlarged or contracted and upon which cylindrical or tapering columns may be made, or columns—known as swelled columns,—which curve in a longitudinal direction.

With these general objects in view and others as hereinafter appear, the invention consists in certain novel and peculiar features of construction of the columns and of the apparatus for making them and in the method of applying the plastic material as hereinafter described and claimed; and in order that the invention may be fully understood reference is to be had to the accompanying drawings, in which:—

Figure 1, is a central longitudinal section of a core embodying my invention; said figure also showing part of a lathe for revolving such core to facilitate the application thereto of a plastic compound and a certain reinforcement employed in the making of a column. Fig. 2, is a view showing the core adjusted to tapering form and also illustrates how the column is made upon such form. Fig. 3, is a cross-section taken through the outer part and the rod of the core, on the line III—III of Fig. 1, and showing one of the sleeves and the links connected thereto, in elevation. Fig. 4, is a top view of the column shown by Fig. 2. Fig. 5, is an enlarged cross section of a column intended to carry a greater load than that shown in Fig. 2, and also shows the core therein. Fig. 6, is a view showing in process of construction, the column shown by Fig. 5. Fig. 7 is a fragmentary sectional view of a column of a stronger type than those hereinbefore referred to. Fig. 8, is a top plan view of a column illustrated by Fig. 7, when erected and completed.

Referring first to the core employed in the making of either type column, 1 indicates a series of sleeves or collars, preferably three in number and each formed at one end with a suitable number of radial bifurcated lugs 2 in which are pivotally secured the inner ends of a corresponding series of radial links 3, pivoted at their outer ends to a corresponding series of bars 4. 5 is a threaded rod—threaded as shown or for its full length—fitting slidingly in the said collars, and mounted on said rod at opposite sides of said collars are nuts 6 provided with radial apertures to receive a rod or lever (not shown) to effect adjustment of said nuts, for a purpose which hereinafter appears. 8 indicates a pair of clamp-plates provided with threaded passages 9 receiving said rod, and arranged at opposite ends of bars 4 and of greater diameter, by preference, than the core when expanded to its fullest extent, as shown in Fig. 1.

10 and 11 indicate parts of an ordinary turning lathe to engage opposite ends of rod 5 to support and revolve the core constituted by the parts 1 to 7 inclusive.

When the links occupy the position shown in Fig. 1, the core is diametrically expanded to its fullest extent and the bars 4 are relatively spaced their greatest distance apart, and to clamp the core in such position, the plates 8 are turned by a pipe-wrench or otherwise until they engage the opposite ends of bars 4. When it is desired to produce a tapering column corresponding substantially to that shown in Fig. 2, the operator inserts the rod or lever hereinbefore mentioned, in a perforation of one of the nuts 6 of the middle set, and turns such nut so as to move it a suitable distance from the adjacent or middle collar 1, the other elements of the core except the other nuts, being incidentally turned on rod 5, this turning action, of course, being performed before plates 8 are caused to clamp the ends of the bars. The operator then inserts said rod or lever in the corresponding nut 6 of one of the end sets of such nuts, and repeats said former operation but turns the engaged nut and core a greater number of times than before in order to dispose said nut a greater distance from the adjacent collar 1, than the first nut 6 was moved from its adjacent collar 1. The operator next turns the nearest plate 8 on the rod to move it the desired distance from the end of the core and then turns the other plate 8 so as to cause it to push the bars endwise toward the plate 8 which was withdrawn therefrom, the result of this action causing the links to swing in the same direction and contract the core, the middle links and the links at the end nearest the withdrawn plate, swinging inward a greater distance because their collars 1 slide in the opposite direction on rod 5 until they are arrested by their respective nuts 6 which were adjusted upon rod 5. As a result of the manipulation described the core is caused to assume a tapering form as shown in Fig. 2.

To produce a column for supporting comparatively light loads, a wrapper 12 of building paper or its equivalent is secured around the core as shown in Fig. 2, to bridge and close the interstices or spaces between the bars of the core. The lathe is then operated to revolve the rod and core, and the operator with a trowel or other suitable tool, applies plastic material to the paper, working the tool from end to end so as to build up a coat 13, of the plastic material, of uniform thickness. If desired, before the column is fully built up to the required thickness with such material, the operator may reinforce it by means of a cord or wire 14 wound spirally upon the plastic material, as shown in Fig. 2 this operation being performed by attaching one end of the cord or wire to the column in any suitable manner and then starting up the lathe and drawing the free end of the cord or wire laterally so that it shall be wound spirally from end to end of the column, the end of the cord or wire being then drawn in the opposite direction to wind in intersecting planes until it reaches the end from which it started. This double winding of the cord or wire imparts greater strength and rigidity to the columns. The operator after thus reinforcing the column, applies a second or outer coat 15 of plastic material, as also indicated in Fig. 2, and if desired can embellish the column by building upon its base top and intermediate moldings, 16, if desired. The core and rod, with the column thus built, is then removed from the lathe to permit the latter to be used in building a second column, and after the plastic material of the first column is set, it is replaced in the lathe. The plate 8 which was first adjusted away from the end of the core, is then turned to again move it away from the core, and the other plate 8 is turned in the proper direction to again force the bars of the core toward the withdrawn plate, it being noticed in this connection by reference to Fig. 2. that the base of the column terminates short of the adjacent plate 8 in order to permit of the adjustment of said plate last referred to. This adjustment of the last-named plate causes a further and uniform diametric contraction of the core so as to withdraw the same from contact with the lining of the column, which lining, by the way, is for the purpose of preventing plastic material entering the interstices between the bars 4. The core is then removed from the lathe and slid out of the column.

For making columns of greater strength than that described, the operations outlined are repeated up to and including the application of the lining to the core. The operator then secures around the lining at suitable distances apart a number of bands 17 having at suitable intervals U shaped portions 18 which open outwardly. Longitudinally arranged reinforce rods 19 are then fitted in the U shaped portions of the bands and wired thereto as shown at 20. A coat 21 of plastic material is then applied upon the lining and by preference is built up until it embeds the bands and rods therein. A preferably foraminous metal wrapper reinforcement 22 is then secured around such coat, rods and bands and upon the foraminous or skeleton reinforcement 22. a wire reinforcement 23 is spirally wound in the same manner that the cord or wire 14 was applied. The finish coat 24 of plastic material is then applied in the manner explained to complete the column.

When it is desired to produce a column of the strongest type, the construction shown in Figs. 5 and 6, is duplicated except that the lining 12 and first coat 21 of plastic material is omitted, as shown by Fig. 7, it being obvious that when the outside coat is applied that it will project through the interstices of the foraminous reinforcement substantially as indicated at 25 in the last-named figure. After this column is set and removed from the core in a manner similar to that hereinbefore described and the column is erected, it is filled with concrete or analogous material as shown at 26, this material adhering or bonding firmly to the coat 24 so as to produce a solid reinforced concrete or plastic column which is of strength and practically indestructible. It will be understood, of course that the hollow column provided with a lining may be filled with concrete if desired, but if so the filling will not bond properly with the column itself because of the interposition of the lining.

From the above description it will be apparent that I have produced a quick and economical method and means for producing plastic or artificial stone columns, either of the reinforced or non-reinforced type.

Having thus described the invention what I claim as new and desire to secure by Letters Patent is:—

1. The method of making plastic columns, consisting in placing annular bands around a revoluble core, then tying longitudinal reinforce rods to said bands, then applying a plastic layer upon the core while the same is revolving, this layer being of sufficient thickness to embed said bands and rods, then winding on the partly completed column an open-work reinforcing material, and then applying additional plastic material to and building it up around and upon the said reinforcing material this last layer of plastic material being worked through said open-work reinforcing material and thus form a monolithic column.

2. The method of making plastic columns, consisting in covering a revoluble core with a wrapper, then applying a plastic layer upon said core while the same is revolving, then winding a strand of flexible metal upon said plastic layer from one end of the core to the other and then back again so that the two windings shall occupy intersecting planes, then applying additional plastic material to and building it up, around and upon the first layer of plastic material and the reinforcement thereon, and then removing the core from the interior of the wrapper.

In testimony whereof I affix my signature, in the presence of two witnesses.

ALBERT G. HIGGINS.

Witnesses:
L. B. WHERRITT,
G. Y. THORPE.